United States Patent Office 3,305,092
Patented Feb. 21, 1967

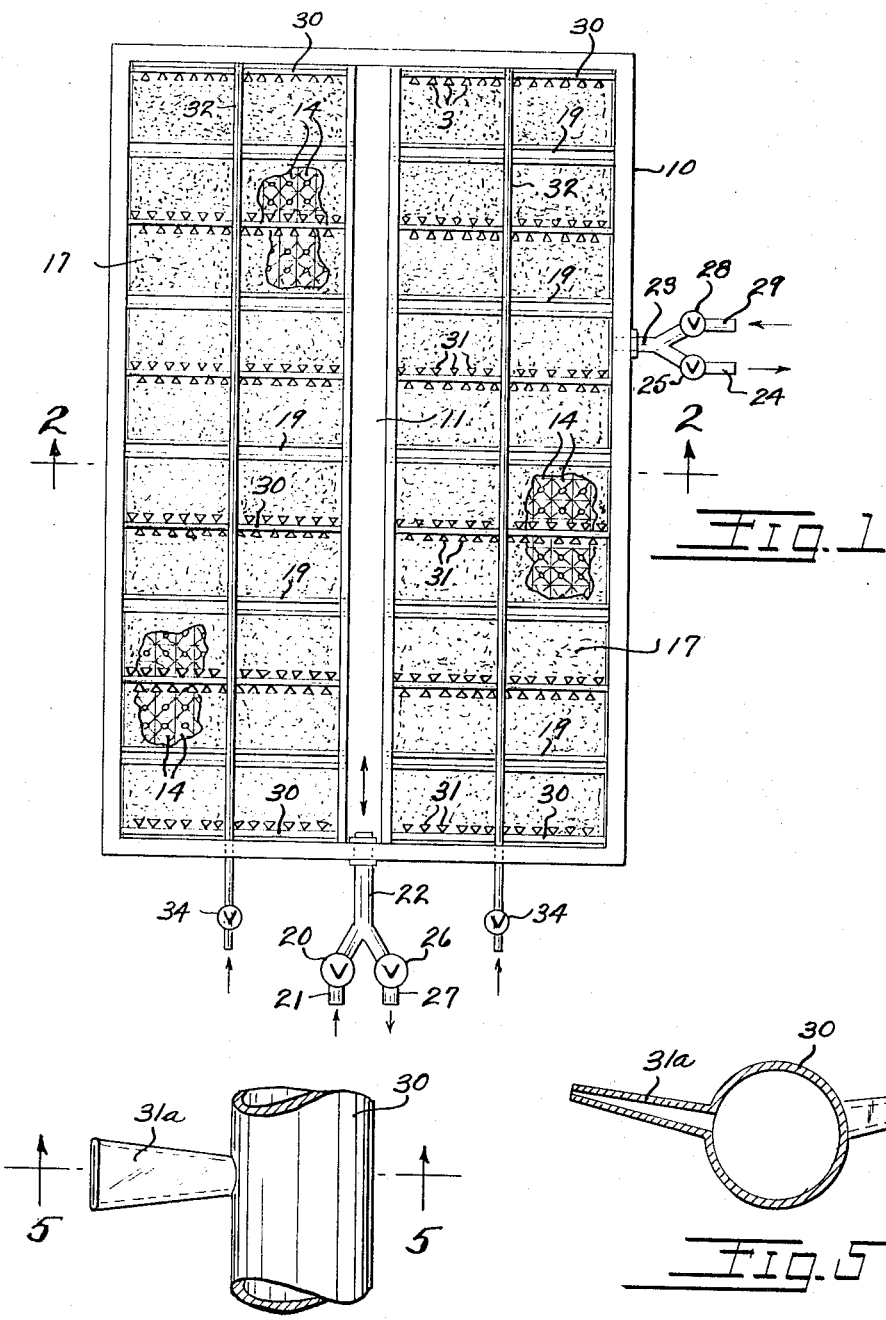

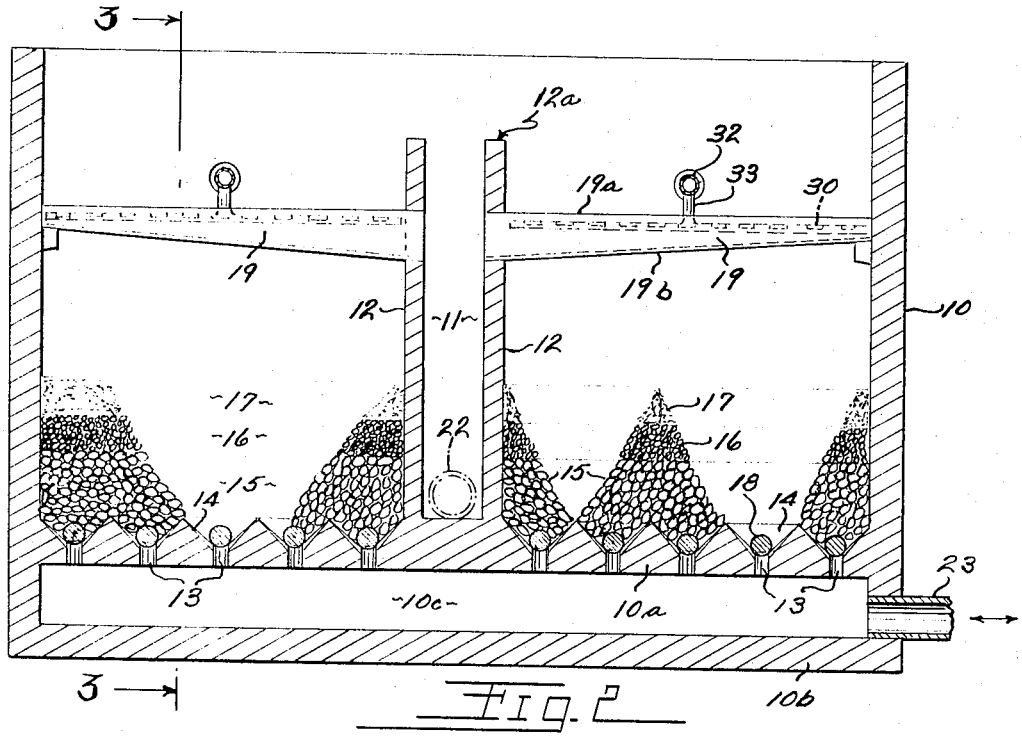
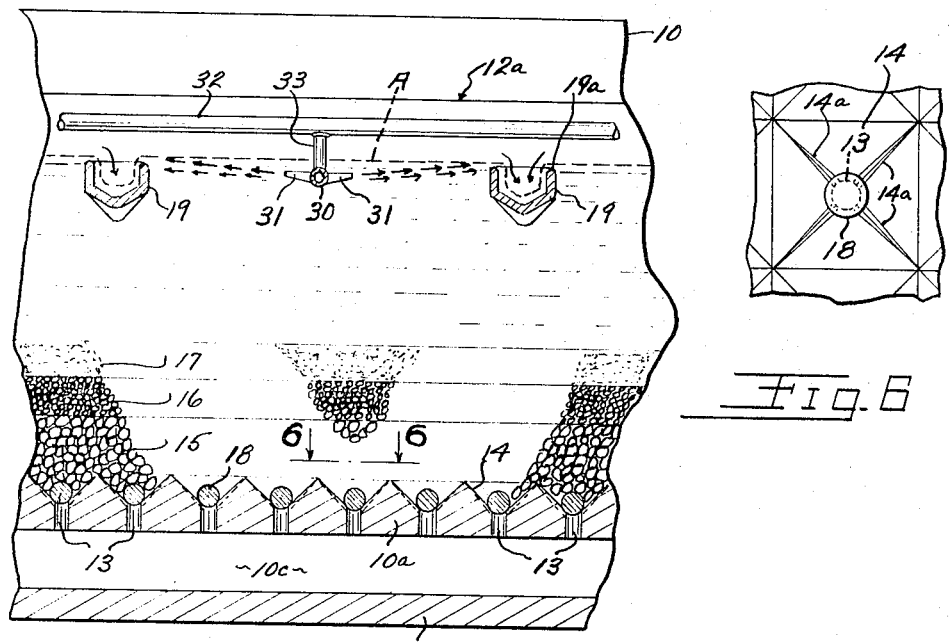

3,305,092
PRESSURE-FLUID ACTUATED
SKIMMER AND METHOD
Harold A. Turk, 8026 State Rte. 43,
Streetsboro, Ohio 44240
Filed May 20, 1963, Ser. No. 281,521
3 Claims. (Cl. 210—80)

This invention relates to improvements in a pressure fluid actuated skimmer apparatus and method for removing floating solids from the surface of a liquid reservoir.

One of the objects of the present invention is to provide a simple but efficient skimmer apparatus for removing finely divided solids floating on or near the surface of a liquid reservoir by means of submerged jets a few inches below the surface of the liquid in the reservoir and supplied with pressurized fluid under sufficient pressure to move the floating solids, together with a layer of liquid substantially greater in volume than the pressurized jet streams to and into a drain trough, skimming weir or the like. A preferred use of this improved apparatus and method is in a water filtering system wherein water is filtered by passing downwardly through a filter bed of decreasing density in a downward direction whereby floc and other impurities in the water are filtered out and remain in the upper layer of the filter bed, and wherein the filter bed is periodically cleaned by backflowing clean water upwardly through the filter bed which removes the floc and other impurities from the filter media to the top of the drain trough or skimming weir where my improved apparatus and method quickly skims the floc and other impurities from the top of the liquid in the reservoir moving the same towards and into the drain troughs or skimming weir, thereby materially speeding up the time required and the amount of water required to back wash, flush or clean the filter media. This same improved apparatus and method of this invention might be applied to any similar reservoir situation where debris floating on or near the surface of the reservoir needs to be skimmed off to a trainage trough or the like.

Other objects and advantages of this invention will be apparent from the accompanying drawings and description and the essential features thereof will be set forth in the appended claims.

In the drawings:

FIG. 1 is a top plan view, somewhat diagrammatic, showing a system for filtering floc or other impurities out of water, parts being broken away to more clearly illustrate the construction of the bottom of the reservoir;

FIG. 2 is a transverse sectional view, enlarged, taken along the line 2—2 of FIG. 1;

FIG. 3 is a fragmental vertical section taken along the line 3—3 of FIG. 2;

FIG. 4 is an enlarged view of a skimmer pipe with attached jet forming a part of the skimming apparatus of this invention;

FIG. 5 is a fragmental sectional view taken along the line 5—5 of FIG. 4; while

FIG. 6 is a top plan view illustrating the construction surrounding one of the openings in the bottom of the reservoir.

Referring to FIGS. 1, 2 and 3, a reservoir 10 of concrete or the like is provided for a reservoir in a water filtering system such as is commonly found in a city water supply. This reservoir has continuous side and end walls and a hollow bottom having an upper partition wall 10a spaced above the bottommost wall 10b. In this form of reservoir, a central trough 11 is provided extending midway through the one dimension of the reservoir and comprising a pair of parallel walls 12 which extend to a level 12a somewhat below the top of the reservoir walls 10.

The bottom partition wall 10a is provided with a plurality of evenly spaced inlet and outlet openings 13 which in one form commonly in use are provided at the bottom of inverted truncated pyramid pockets 14 arranged in an even pattern over the entire bottom as indicated in FIGS. 1, 2 and 3. A filter bed is built upwardly from the bottom partition wall 10a and usually consists of a lowermost layer 15 of coarse gravel upon which is superimposed a higher layer 16 of smaller gravel and on top of this is a top layer 17 which quite often is of either finely divided coal or sand. Thus, the filter bed is of increasing density as one moves upwardly. To prevent the filter bed material from escaping downwardly through the openings 13, suitable means is provided such as one or more masonry balls 18 resting in the pocket 14. Only one such ball is shown for simplicity in the drawings but those skilled in this art will understand that quite often a plurality of other small balls are clustered around the large one. In order to provide flow, channels 14a of small cross-sectional dimension permit flow of water in and out beneath the ball 18 or other balls in the pocket.

Spaced above the top layer 17 of the filter bed are a plurality of parallel troughs 19 which have a horizontal upper edge 19a and a sloping bottom 19b which is higher at the side walls of the reservoir and which slope downwardly and pass through suitable openings in the partition walls 12 so that the troughs communicate with the central channel 11.

Control of the raw water to be filtered is through pipe 21 controlled by valve 20 and leading through pipe 22 into the central channel 11. This causes the raw water to rise in the channel 11 and flow outwardly through the troughs 19, over the top of the troughs, or sometimes over the top of the walls 12, after which the water passes downwardly through the layers of the filter bed, then through the openings 13 into the hollow bottom 10c and outwardly through pipes 23 and 24 under the control of valve 25 to a filtered water collection zone. At this time valves 26 and 28 are closed. When the filter bed gets dirty, back flow is provided by closing valves 20 and 25 and opening valves 28 and 26. Clean water then flows through pipes 29 and 23 from the clean water supply into the hollow bottom 10c and upwardly through openings 13, upwardly through the filter bed and upwardly through the reservoir to the troughs 19 which then discharge toward the central channel 11 and outwardly through valve 26 and pipe 27 to the sewer or other point of disposal.

My improved skimmer aparatus is applied to the above water system as follows. A pipe 30 is provided parallel to and midway between each pair of troughs 19 and to opposite sides of this pipe are affixed nozzles 31 which are preferably evenly spaced along the pipe 30 and preferably staggered with respect to each other so that the nozzle 31a seen in FIGS. 4 and 5 is approximately equally spaced between two nozzles 31b on the opposite side of the pipe 30. Preferably, but not necessarily, the nozzles are flared at their outer ends so as to provide a thin, flat, fan-shape jet which will diverge away from the nozzles and toward the associated trough 19 so as to entrain liquid from the reservoir in the jet stream thus moving an added volume of liquid in the reservoir to that actually passing through the nozzle 31a or 31b. The nozzles or jets 31 are submerged a few inches below the level A of the water in the reservoir during the skimming operation which is approximately at the level of the upper edges 19a of the associated drain troughs although normally it would be just slightly above 19a as will be readily understood. Normally, the submergence of the jets at point of issue will be between one and six inches and in a preferred embodiment, where the troughs 19 were approximately 52 inches apart, the jets at the end of the nozzles 31 were submerged a few inches in the liquid of the reservoir. The jets 31 should be directed approximately toward the upper edges 19a of the corresponding troughs as indicated by the arrows in FIG. 3. This calls for the nozzles to be slightly upwardly directed as they leave the pipe 30 as indicated in FIG. 5. In the above mentioned case of the spacing of the troughs 19 eleven feet apart, the nozzles 31 are inclined upwardly at approximately 10° from the horizontal. Means is provided for supplying pressure fluid to the pipes 30. In the above mentioned water system, pipes 32 are provided running at right angles to the pipes 30 and connected by vertical nipples 33 to each of the pipes 30. As seen in FIG. 1, each of these pipes 32 which is connected with a source of pumped water supply has a shut off valve 34.

The operation of my invention should now be clear. After the filter bed is properly prepared, valve 20 is opened to let raw water pass through pipe 22 and central channel 11 into the troughs 19 where it spills over and fills the reservoir to any desired height, say the top of the walls 12. The water works down through the filter bed which removes the floc and other impurities in the upper layers of the filter media 17. It then passes in the hollow bottom space 10c and out through pipe 23, valve 25 and clean water discharge 24 to a suitable collection zone. At suitable intervals, when the filter bed is dirty, the valves 21 and 25 are closed and valves 26 and 28 are opened so as to back flow the filter bed to clean it. Clean water then enters through pipe 29, valve 28, pipe 23, hollow bottom 10c and openings 13 upwardly through the filter bed floating the floc and other impurities from the upper layers 17 carrying this material to the top of the reservoir where it floats on or near the surface of the water. At this time, the level of the reservoir falls to approximately the upper edge 19a of the troughs 19 or very slightly thereabove. The water flushed out of the reservoir passes downwardly through the channel 12 and out through pipe 22, valve 26 and pipe 27 to the sewer or otherwise. At this time, the valves 34 are opened so as to cause the jets to emerge from the nozzles 31. In the above mentioned example of a city water system, I have found that clean water under 90 pounds per square inch is sufficient to cause the jet action desired. This causes a strong movement of the surface water and the floating solid particles entrained along with the high velocity jet streams so that there is a strong movement of water and debris in the direction of the arrows of FIG. 3 to the tops of the troughs 19 and over and into the troughs to drain away as above described.

In the above mentioned example of a water system utilizing my device, a reservoir having approximately 760 square feet usually took seven to eight minutes for back flow at periodic cleaning intervals when my invention was not in use. With my invention, this time was cut down between one and two minutes with a resulting large saving in clean water which was saved for use in the water system instead of being used in the back flow operations.

What is claimed is:

1. In a filtering system having a reservoir with inlet and outlet openings through the bottom and having a filter bed resting upon said bottom and increasing in density upwardly and having parallel discharge troughs above said bed and communicating to a point outside said reservoir, together with means for introducing raw water above said bed and for removing filtered water from beneath said bottom to a collection zone, and together with means for back flowing clean water through said bottom inlet openings and upwardly; the combination of a pipe parallel to and substantially midway between said troughs and provided with jets on opposite sides thereof a few inches below the upper edges of said troughs, said jets directed approximately toward the upper edges of said troughs, and means for supplying clean water from said collection zone to said pipe under pressure sufficient to drive solid material floating in said reservoir to and into said troughs.

2. The method of removing floating solids from the surface of a liquid reservoir including driving said floating solids to and into parallel drain troughs by means of pressurized fluid jets submerged a few inches below the surface of the liquid in said reservoir and directed toward said troughs.

3. The method of removing floating and suspended floc and solids and waste material from the surface area of a liquid reservoir including driving said floating solids to and into parallel drain troughs by means of pressurized water jets under about 90 pounds per square inch pressure and submerged below the surface of the liquid in said reservoir between about one and six inches and directed toward said troughs.

References Cited by the Examiner

UNITED STATES PATENTS

| | | | |
|---|---|---|---|
| 522,043 | 6/1894 | Bowden | 210—275 X |
| 629,942 | 8/1899 | Wanner | 210—264 |
| 647,780 | 4/1900 | Wilson | 210—264 |
| 838,626 | 12/1906 | Kirby | 210—525 X |
| 1,151,313 | 8/1915 | Wheeler | 210—275 X |
| 1,981,310 | 11/1934 | Currie | 210—540 |
| 2,296,824 | 9/1942 | Ashworth | 210—80 |
| 3,134,735 | 5/1964 | Greenleaf | 210—290 |

REUBEN FRIEDMAN, *Primary Examiner.*

SAMIH N. ZAHARNA, *Examiner.*